(12) United States Patent
Fang et al.

(10) Patent No.: US 11,014,044 B2
(45) Date of Patent: May 25, 2021

(54) WASTE GAS PURIFICATION SYSTEM AND METHOD

(71) Applicant: SOUTH CHINA INSTITUTE OF ENVIRONMENTAL SCIENCE. MEE, Guangzhou (CN)

(72) Inventors: Ping Fang, Guangzhou (CN); Chaoping Cen, Guangzhou (CN); Zijun Tang, Guangzhou (CN); Xiongbo Chen, Guangzhou (CN); Jianhang Huang, Guangzhou (CN)

(73) Assignee: South China Institute of Environmental Science, MEE, Guangdong (CN)

( * ) Notice: Subject to any disclaimer, the term of this patent is extended or adjusted under 35 U.S.C. 154(b) by 210 days.

(21) Appl. No.: 16/389,158

(22) Filed: Apr. 19, 2019

(65) Prior Publication Data
US 2020/0070090 A1    Mar. 5, 2020

(30) Foreign Application Priority Data

Sep. 3, 2018 (CN) .......................... 201811018556.8

(51) Int. Cl.
*C01B 13/10* (2006.01)
*B01D 53/75* (2006.01)
(Continued)

(52) U.S. Cl.
CPC ............. *B01D 53/75* (2013.01); *B01D 53/76* (2013.01); *B01D 53/78* (2013.01); *B01D 53/82* (2013.01);
(Continued)

(58) Field of Classification Search
CPC ..... C04B 18/0472; C04B 18/062; F23G 5/00; F23G 7/066; F23G 7/068; F23G 2206/10;
(Continued)

(56) References Cited

U.S. PATENT DOCUMENTS

| 8,470,273 B2 * | 6/2013 | Saito | B01D 53/86 423/210 |
| 2016/0199779 A1 * | 7/2016 | Rohloff | B01D 53/58 423/224 |
| 2018/0326351 A1 * | 11/2018 | Allegrucci | B01D 53/60 |

FOREIGN PATENT DOCUMENTS

| CA | 2 672 580 C | * | 2/2015 | ........... B01D 53/501 |
| KR | 2011 0 132 330 A | * | 12/2011 | ............. B01D 53/64 |
| WO | WO 2009 154 088 A1 | * | 12/2009 | ............. B01D 53/75 |

* cited by examiner

*Primary Examiner* — Timothy C Vanoy
(74) *Attorney, Agent, or Firm* — Avant Law Group, LLC

(57) ABSTRACT

A waste gas purification system according to an embodiment includes an adsorption-catalysis-oxidation unit, an enhanced absorption unit, an air inducing unit, and a flue gas discharge and heat exchange unit that are sequentially connected. The waste gas enters a heat exchange device of the flue gas discharge and heat exchange unit through a first waste gas delivery pipeline to perform heat exchange, then is converged with waste gas in a second waste gas delivery pipeline and enters a third waste gas delivery pipeline. Waste gas in the third waste gas delivery pipeline is purified after sequentially passing through the adsorption-catalysis-oxidation unit and the enhanced absorption unit. Purified flue gas is introduced into the flue gas discharge and heat exchange unit by the air inducing unit, and the purified flue gas is discharged after performing heat exchange with the heat exchange device.

11 Claims, 2 Drawing Sheets

(51) Int. Cl.
*B01D 53/76* (2006.01)
*B01D 53/78* (2006.01)
*B01D 53/82* (2006.01)
*B01D 53/86* (2006.01)

(52) U.S. Cl.
CPC .............. *B01D 53/86* (2013.01); *C01B 13/10* (2013.01); *B01D 2251/104* (2013.01); *B01D 2253/102* (2013.01)

(58) Field of Classification Search
CPC . F23G 2206/00; B01D 2257/60; B01D 53/82; B01D 53/76; B01D 53/78; B01D 53/86; B01D 2257/302; B01D 53/75; B01D 2253/102; B01D 2257/404; B01D 2258/0291; B01D 2257/20; B01D 2257/708; B01D 2251/104; C01B 13/10; F28D 2021/0024

See application file for complete search history.

WASTE GAS PURIFICATION SYSTEM AND METHOD

CROSS REFERENCE TO RELATED APPLICATIONS

This application claims priority to Chinese patent application number CN 201811018556.8 filed on Sep. 3, 2018, the disclosure of which is incorporated by reference herein in its entirety.

FIELD OF THE DISCLOSURE

The disclosure relates generally to the field of air pollution control technologies. More specifically, the disclosure relates to the field of waste gas purification systems and methods.

BACKGROUND

In recent years, China's solid waste incineration, biomass combustion, and other industries have developed rapidly, and increasing combustion facilities are put into operation. In addition, with the implementation of industrial policies in which industrial kilns such as cement kilns are used for cooperation with solid waste disposal, a large number of industrial kilns such as cement kilns have been applied to cooperation with solid waste disposal. The implementation of the above policies and technologies plays a huge role in control and treatment of solid waste pollution and environment improvement, but popularization and application of the above policies and technologies also bring some air pollution problems. At present, there are already mature technologies for flue gas treatment in China. For example, dust removal (bag type and electrostatic dust removal), desulfurization (wet desulfurization), denitration (SNCR, SCR) technologies are used to implement standard emission of flue gas pollutants. For treatment of industrial organic waste gases, currently, there are mainly the following types of technologies that may achieve standard emission: absorption, adsorption, catalytic combustion, and the like. However, components of complex waste gases generated by solid waste incineration and the like are more complex than those of conventional flue gas and industrial organic waste gases, include organic components (VOCs) and inorganic components ($NO_x$, $SO_2$, heavy metal, fluoride, chloride, and the like). An existing single flue gas treatment technology may not effectively remove organic components in waste gases, and a pure organic waste gas pollution control technology is not suitable for removal of inorganic components in waste gases, if a conventional flue gas treatment technology and an organic waste gas treatment technology are combined, large space is occupied, a process is complex, investment operating costs are high, and an engineering application is unrealistic.

The Chinese patent 201310017719.1 has disclosed an industrial flue gas treatment system based on advanced oxidation. ultraviolet ray-$O_3$ advanced oxidation+water absorption+alkali absorption+technology to implement removal of pollutants such as $SO_2$, $NO_x$, and Hg, but the process system is complex, many equipment is required, large space is occupied, and removal of pollutants such as $NO_x$ and Hg relies only on $O_3$ oxidation, $O_3$ consumption is high, investment operating costs are high, and an effect of removal of organic matters such as VOCs in the process is not described in the patent. The Chinese patent 201711347207.6 has disclosed a honeycomb catalyst for simultaneous denitrification and VOC removal of flue gas and its preparation method. In the patent, based on an existing SCR denitrification technology, a new catalyst is developed for denitrification while removing some VOCs, but this process may not perform desulfurization, dust removal, and fluoride/chloride/heavy metal removal. The Chinese patent 201410033812.6 has disclosed an absorbent for simultaneous desulfurization, denitrification, and VOC removal of flue gas. Through absorption and complexation, the efficiency for removal of $SO_2$ is greater than or equal to 90%, the efficiency for removal of $NO_x$ is greater than or equal to 65%, and a VOC removal rate is 80%. However, a heavy metal removal effect in this process is limited, and there is also a problem of secondary volatilization of $NO_x$ and VOCs, and the like.

Therefore, for treatment of complex waste gases containing organic and inorganic components, there is a need for economic and efficient treatment technologies. With the increasingly severe situation of environmental protection in China, increasing attention has been paid to the emission of complex waste gases containing organic and inorganic components, and the emission standard will be increasingly strict. Therefore, a widely applicable economical and efficient deep treatment technology for complex waste gases containing organic and inorganic components is developed and popularized for application, and will effectively improve the current situation of industrial waste gas treatment in China and promote the development of the industrial waste gas treatment industry.

SUMMARY

In some embodiments, an objective is to provide a waste gas purification system and method, which may implement deep treatment of complex waste gas containing organic and inorganic components, and features a wide application range, an economic effect, and high efficiency. Some embodiments may provide some technical solutions to achieve the objective.

In an embodiment, a waste gas purification system includes an adsorption-catalysis-oxidation unit, an enhanced absorption unit, an air inducing unit, and a flue gas discharge and heat exchange unit that are sequentially connected; waste gas enters a heat exchange device of the flue gas discharge and heat exchange unit through a first waste gas delivery pipeline to perform heat exchange, then is converged with waste gas in a second waste gas delivery pipeline, and enters a third waste gas delivery pipeline; waste gas in the third waste gas delivery pipeline is purified after sequentially passing through the adsorption-catalysis-oxidation unit and the enhanced absorption unit; and purified flue gas is introduced into the flue gas discharge and heat exchange unit by the air inducing unit, and the purified flue gas is discharged after performing heat exchange with the heat exchange device.

Alternatively, the adsorption-catalysis-oxidation unit includes an ozonator and an adsorption catalysis oxidation tower, a gas distribution plate is disposed at a lower part inside the adsorption catalysis oxidation tower, a gas outlet of the adsorption catalysis oxidation tower is disposed at an upper part inside the adsorption catalysis oxidation tower, gas inlet pipes and adsorption catalysis module layers are disposed between the gas distribution plate and the gas outlet of the adsorption catalysis oxidation tower; the gas inlet pipes and the adsorption catalysis module layers are in cross arrangement vertically; and the ozonator is connected to a first ozone delivery pipeline, and the first ozone delivery pipeline is connected to the gas inlet pipe after being combined with the third waste gas delivery pipeline.

Alternatively, the enhanced absorption unit includes an absorption tower and an absorption liquid preparation unit; a liquid outlet, a gas inlet of the absorption tower, a vortex plate, a spray layer, a baffle plate, an ozone inlet pipe, an activated carbon layer, and a gas outlet of the absorption tower are disposed from down to top inside the absorption tower; flue gas passing through the adsorption-catalysis-oxidation unit enters the absorption tower through the gas inlet of the absorption tower; the ozonator is communicated with the ozone inlet pipe through a second ozone delivery pipe, and the spray layer sprays absorption liquid downwards; and the absorption liquid preparation unit includes a reagent preparation tank and an absorption liquid circulating water tank, the reagent preparation tank is used for preparing a reagent, and the absorption liquid circulating water tank is communicated with both the liquid outlet of the absorption tower and a reagent delivery pipe.

Alternatively, the absorption liquid preparation unit further includes a reagent storage tank, the reagent storage tank is used for storing the reagent prepared by the reagent preparation tank, a first absorption liquid delivery pipeline is disposed between the reagent preparation tank and the reagent storage tank, and a first reagent pump and a first flowmeter are disposed on the first absorption liquid delivery pipeline.

Alternatively, a pH meter is disposed in the absorption liquid circulating water tank, a second absorption liquid delivery pipeline is disposed between the reagent storage tank and the absorption liquid circulating water tank, a second reagent pump and a second flowmeter are disposed on the second absorption liquid delivery pipeline, and a flow rate of a reagent input to the absorption liquid circulating water tank is adjusted according to a pH value of the pH meter.

Alternatively, the enhanced absorption unit further includes a circulating water pump, and the circulating water pump delivers absorption liquid in the absorption liquid circulating water tank to the spray layer.

Alternatively, the air inducing unit includes a draught fan, the gas outlet of the absorption tower is communicated with a gas inlet of the draught fan, and a gas outlet of the draught fan is communicated with a gas inlet at the bottom of the flue gas discharge and heat exchange unit.

Alternatively, the flue gas discharge and heat exchange unit includes a chimney, a first waste gas delivery pipeline, a second waste gas delivery pipeline, and a temperature measurement probe; a gas inlet, a heat exchange device, a flue gas monitoring device, and a flue gas discharge port are sequentially disposed inside the chimney from bottom to top; a first electric valve is disposed on the first waste gas delivery pipeline; a second electric valve is disposed on the second waste gas delivery pipeline; flue gas introduced by the draught fan enters the chimney through the gas inlet, and is discharged through the flue gas discharge port after having undergone heat exchange in the heat exchange device; the first waste gas delivery pipeline is combined with the second waste gas delivery pipeline after passing through the heat exchange device in the chimney; and the temperature measurement probe is arranged on a pipeline that is obtained after the first waste gas delivery pipeline and the second waste gas delivery pipeline are combined.

Alternatively, the system further includes a control unit, the control unit is configured to adjust opening degrees of the first electric valve and the second electric valve according to data collected by the temperature measurement probe and the flue gas monitoring device, and the control unit is further configured to adjust, according to monitoring data of the pH meter, the flow rate of the reagent entering the absorption liquid circulating water tank.

A waste gas purification method may be applied to the above waste gas purification system, wherein the method includes: introducing waste gas into a flue gas discharge and heat exchange unit; collecting monitoring data of a temperature measurement probe and a flue gas monitoring device; adjusting opening degrees of a first electric valve and a second electric valve according to the monitoring data of the temperature measurement probe and the flue gas monitoring device; mixing flue gas passing through the flue gas discharge and heat exchange unit with ozone generated by an ozonator; introducing mixed flue gas into an adsorption-catalysis-oxidation unit; introducing, into an enhanced absorption unit, flue gas treated by the adsorption-catalysis-oxidation unit; adding a reagent to an absorption liquid circulating water tank according to a pH value in the absorption liquid circulating water tank collected by a pH meter; introducing absorption liquid circulating water into a spray layer in the enhanced absorption unit; introducing, through a draught fan, flue gas passing through the enhanced absorption unit into the flue gas discharge and heat exchange unit for heat exchange, and discharging, through a flue gas discharge port of the flue gas discharge and heat exchange unit, the flue gas having undergone heat exchange.

In some embodiments, a waste gas purification system includes an adsorption-catalysis-oxidation unit, an enhanced absorption unit, an air inducing unit, and a flue gas discharge and heat exchange unit that are sequentially connected. The waste gas enters a heat exchange device of the flue gas discharge and heat exchange unit through a first waste gas delivery pipeline to perform heat exchange, then may be converged with waste gas in a second waste gas delivery pipeline, and enters a third waste gas delivery pipeline. The waste gas in the third waste gas delivery pipeline may be purified and converted to a purified flue gas by sequentially passing through the adsorption-catalysis-oxidation unit and the enhanced absorption unit. The purified flue gas may be introduced into the flue gas discharge and heat exchange unit by the air inducing unit, and the purified flue gas may be discharged after performing heat exchange with the heat exchange device.

According to some embodiments of the disclosed waste gas purification systems and methods, a combined process of adsorption catalysis oxidation and enhanced absorption may be used, a combination of ozone and activated carbon may be used in a front stage to remove a part of pollutants and improve absorption performance of the pollutants; in addition, production load of a subsequent process may be reduced, efficient removal of various pollutants may be implemented through a subsequent enhanced absorption process. In some embodiments, the present invention may have high pollutant removal efficiency, flexible process selection, simple overall process, easy operation, low investment and operation costs, and wide application in the field of complex waste gas treatment.

DETAILED DESCRIPTION

The described embodiments are merely a part rather than all of the embodiments of the present invention. All other embodiments obtained by a person of ordinary skill in the art based on the embodiments of the present invention without creative efforts shall fall within the protection scope of the present invention.

In some embodiments, an objective of the present invention is to provide a waste gas purification system and method, which may implement deep treatment of complex waste gas containing organic and inorganic components, and feature a wide application range, an economic effect, and high efficiency.

Figure 1:
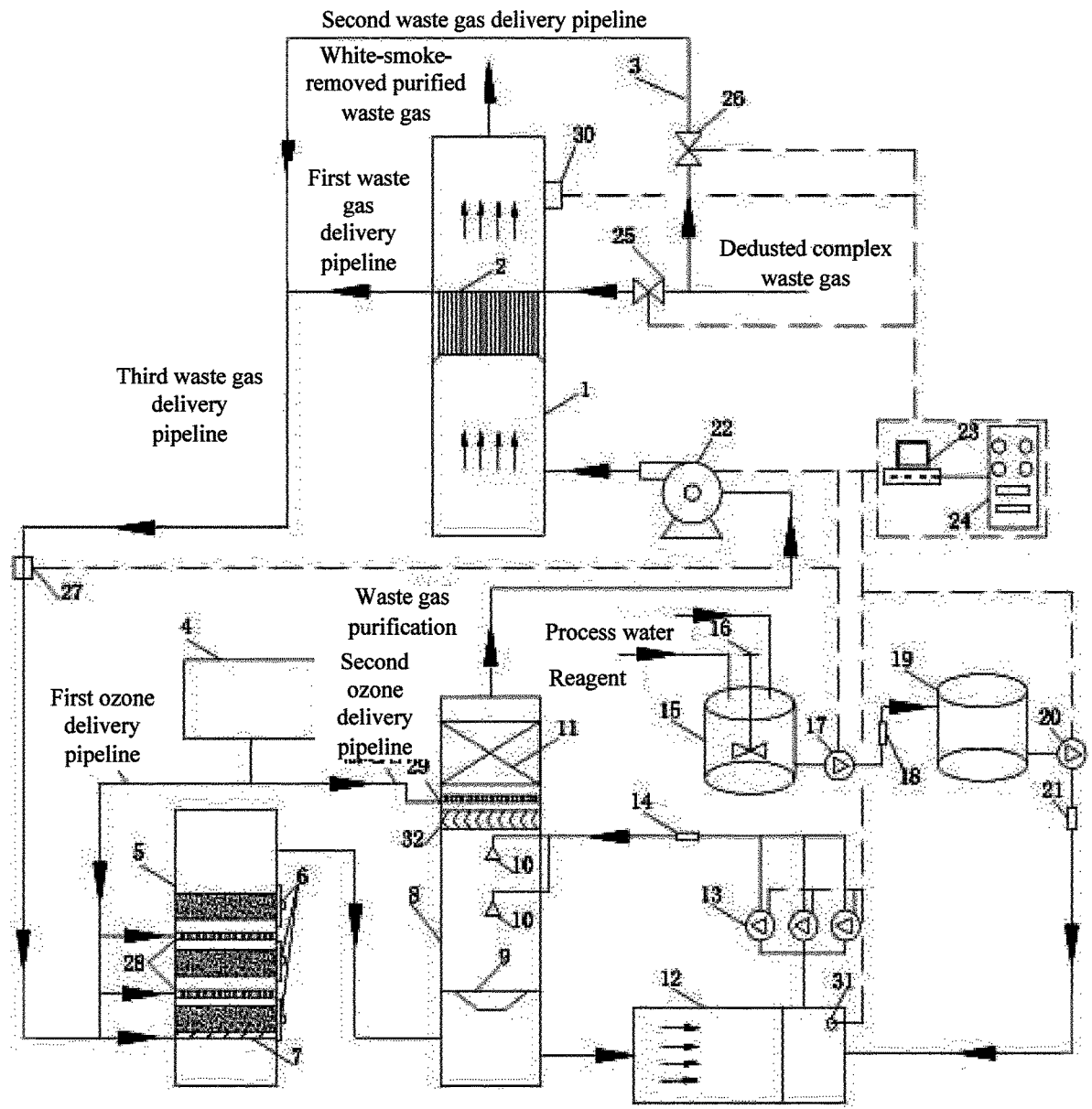
FIG. 1 is a process flowchart of a waste gas purification system according to an embodiment of the present invention.

FIG. 1 is a process flowchart of a waste gas purification system according to an embodiment of the present invention. As shown in FIG. 1, the waste gas purification system provided in the present invention may include a control unit, an adsorption-catalysis-oxidation unit, an enhanced absorption unit, an air inducing unit, and a flue gas discharge and heat exchange unit; waste gas enters a heat exchange device of the flue gas discharge and heat exchange unit through a first waste gas delivery pipeline to perform heat exchange, then is converged with waste gas in a second waste gas delivery pipeline, and enters a third waste gas delivery pipeline; waste gas in the third waste gas delivery pipeline is purified after sequentially passing through the adsorption-catalysis-oxidation unit and the enhanced absorption unit; and purified flue gas is introduced into the flue gas discharge and heat exchange unit by the air inducing unit, and the purified flue gas is discharged after performing heat exchange in the heat exchange device. The control unit is connected to an automatic control instrument of each unit, and controls working of the foregoing units.

The adsorption-catalysis-oxidation unit may include an ozonator 4 and an adsorption catalysis oxidation tower 5, a gas distribution plate 7 is disposed at a lower part inside the adsorption catalysis oxidation tower 5, a gas outlet of the adsorption catalysis oxidation tower is disposed at an upper part inside the adsorption catalysis oxidation tower 5, gas inlet pipes 28 and adsorption catalysis module layers 6 are disposed between the gas distribution plate 7 and the gas outlet of the adsorption catalysis oxidation tower 5; the gas inlet pipes 28 and the adsorption catalysis module layers 6 are in cross arrangement vertically, that is, the gas inlet pipe 28 is disposed at a lower part inside each adsorption catalysis module layer 6; and the ozonator 4 is connected to a first ozone delivery pipeline, and the first ozone delivery pipeline is connected to the gas inlet pipe after being combined with the third waste gas delivery pipeline.

The enhanced absorption unit may include an absorption tower 8 and an absorption liquid preparation unit; a liquid outlet, a gas inlet of the absorption tower, a vortex plate 9, a spray layer 10, a baffle plate 32, an ozone inlet pipe 29, an activated carbon layer 11, and a gas outlet of the absorption tower are disposed from down to top inside the absorption tower; flue gas passing through the adsorption-catalysis-oxidation unit enters the absorption tower 8 through the gas inlet of the absorption tower; and the ozonator 4 is communicated with the ozone inlet pipe 29 through a second ozone delivery pipe, and the spray layer 10 sprays absorption liquid downward.

The absorption liquid preparation unit may include a reagent preparation tank 15 and an absorption liquid circulating water tank 12, where the reagent preparation tank 15 is used for preparing a reagent from incoming process water and reagent by a mixer 16, and the absorption liquid circulating water tank 12 is communicated with both the liquid outlet of the absorption tower 8 and a reagent delivery pipe. The absorption liquid preparation unit may further include a reagent storage tank 19, the reagent storage tank 19 is used for storing the reagent prepared by the reagent preparation tank 15, a first absorption liquid delivery pipeline is disposed between the reagent preparation tank 15 and the reagent storage tank 19, and a first reagent pump 17 and a first flowmeter 18 are disposed on the first absorption liquid delivery pipeline. A pH meter 31 is disposed in the absorption liquid circulating water tank 12, a second absorption liquid delivery pipeline is disposed between the reagent storage tank 19 and the absorption liquid circulating water tank 12, a second reagent pump 20 and a second flowmeter 21 are disposed on the second absorption liquid delivery pipeline, the pH meter 31 is connected to the control unit, and the control unit controls, according to a pH value of the pH meter 31, a flow rate of a reagent input to the absorption liquid circulating water tank 12. The enhanced absorption unit may further include a circulating water pump 13, and the circulating water pump 13 delivers absorption liquid in the absorption liquid circulating water tank 12 to the spray layer 10. A flowmeter 14 is disposed on the pipeline between the circulating water pump 13 and the spray layer 10 to measure the flowrate of the absorption liquid.

The air inducing unit may include a draught fan 22, the gas outlet of the absorption tower is communicated with a gas inlet of the draught fan 22, and a gas outlet of the draught fan 22 is communicated with a gas inlet at the bottom of the flue gas discharge and heat exchange unit.

The flue gas discharge and heat exchange unit may include a chimney 1, a first waste gas delivery pipeline, a second waste gas delivery pipeline 3, and a temperature measurement probe 27; a gas inlet, a heat exchange device 2, a flue gas monitoring device 30, and a flue gas discharge port are sequentially disposed inside the chimney 1 from bottom to top; a first electric valve 25 is disposed on the first waste gas delivery pipeline; a second electric valve 26 is disposed on the second waste gas delivery pipeline 3; flue gas introduced by the draught fan 22 enters the chimney 1 through the gas inlet, and is discharged through the flue gas discharge port after having undergone heat exchange in the heat exchange device 2; the first waste gas delivery pipeline is combined with the second waste gas delivery pipeline 3 after passing through the heat exchange device 2 in the chimney 1; and the temperature measurement probe 27 is arranged on a pipeline that is obtained after the first waste gas delivery pipeline and the second waste gas delivery pipeline 3 are combined.

The control unit may include a control computer 23 and a control cabinet 24, and is configured to adjust opening degrees of the first electric valve 25 and the second electric valve 26 according to data collected by the temperature measurement probe 27 and the flue gas monitoring device 30, and the control unit is further configured to adjust, according to monitoring data of the pH meter 31, the flow rate of the reagent entering the absorption liquid circulating water tank.

Figure 2:
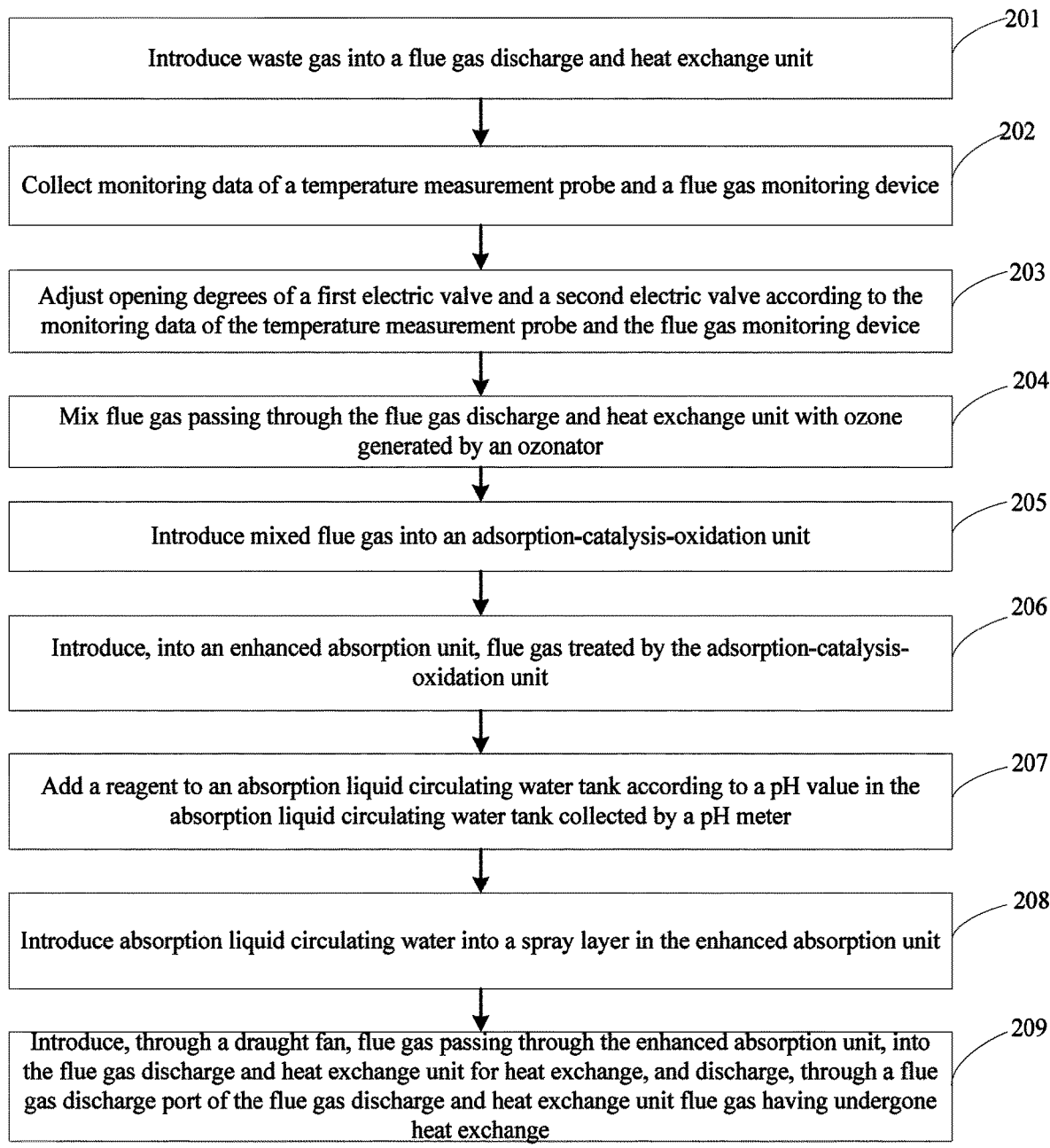
FIG. 2 is a flowchart of a waste gas purification method according to an embodiment of the present invention.

As shown in FIG. 2, a waste gas purification method implemented by using a waste gas purification system may include the following steps:

Step 201. Introduce waste gas into a flue gas discharge and heat exchange unit.

Step 202. Collect monitoring data of a temperature measurement probe and a flue gas monitoring device.

Step 203. Adjust opening degrees of a first electric valve and a second electric valve according to the monitoring data of the temperature measurement probe and the flue gas monitoring device.

Step 204. Mix flue gas passing through the flue gas discharge and heat exchange unit with ozone generated by an ozonator.

Step 205. Introduce mixed flue gas into an adsorption-catalysis-oxidation unit.

Step 206. Introduce, into an enhanced absorption unit, flue gas treated by the adsorption-catalysis-oxidation unit.

Step 207. Add a reagent to an absorption liquid circulating water tank according to a pH value in the absorption liquid circulating water tank collected by a pH meter.

Step 208. Introduce absorption liquid circulating water into a spray layer in the enhanced absorption unit.

Step 209. Introduce, through a draught fan, flue gas passing through the enhanced absorption unit, into the flue gas discharge and heat exchange unit for heat exchange, and discharge, through a flue gas discharge port of the flue gas discharge and heat exchange unit flue gas having undergone heat exchange.

Complex waste gas from a production workshop that has been dedusted enters the flue gas discharge and heat exchange unit first, an opening degree of a valve may be automatically adjusted through temperature feedbacks of the temperature measurement probe and the flue gas monitoring device, to shunt flue gas. A part of the flue gas enters an efficient built-in heat exchange device and performs heat exchange with purified high-humidity flue gas. The high-humidity flue gas may be heated to 80-100° C. to eliminate white smoke. The flue gas having undergone heat exchange may be mixed with remaining flue gas to form to-be-processed flue gas, and temperature of the to-be-processed gas may be 100-150° C., and then the to-be-processed gas enters the adsorption-catalysis-oxidation unit. $O_3$ from an ozonator and flue gas are mixed in a pipeline, and then enter an adsorption-catalysis-oxidation tower. Pollutants such as $NO_x$, VOCs, heavy metal, and the like in the flue gas are in full contact with $O_3$ in the tower, fully react under an action of adsorption and catalysis of an adsorbent filled in an adsorption catalysis module, $O_3$ oxidizes insoluble NO into $NO_2$ in the flue gas, oxidizes a part of VOCs into $CO_2$ and $H_2O$, oxidizes a part of VOCs into a small molecule organic matter that may be easily removed, and oxidizes Hg and other heavy metals into ion forms that are easily absorbed and removed. In addition, some fluorides, chlorides, and other pollutants are adsorbed and removed. $O_3$ may oxidize and decompose pollutants adsorbed on a surface of the adsorbent, so that the adsorbent may be continually regenerated, and therefore the adsorbent in the system does not need to be replaced for regeneration. $O_3$ also may be added in stages from a flue tube and the tower according to requirements. Flue gas treated through adsorption catalysis oxidation processing enters the enhanced absorption unit, and enters from the bottom of an efficient absorption tower. Absorption liquid from the circulating water tank may be lifted by a circulating water pump and sprayed downwards from the top of the tower. The treated flue gas and the absorption liquid are in countercurrent contact and react with each other in the tower. Pollutants in the flue gas are removed through adsorption, dissolution, neutralization, oxidation, complexation, and the like, and then flue gas may be demisted by a demister and may be discharged. Absorption liquid flows out from the tower and enters the absorption liquid circulating water tank for recycling. A PH value of the absorption liquid may be kept at 5-11. An absorption reagent may be prepared in a reagent preparation tank, and may be stored in a reagent use tank. An automatic control system controls a reagent using pump to automatically add an absorption liquid reagent. Purified flue gas enters a chimney after being introduced by a draught fan, and performs heat exchange with a built-in efficient heat exchange device inside a chimney. The purified flue gas may be heated to 80-100° C. to remove white smoke, so as to implement deep purification and standard discharge of complex waste gas.

A heat exchange device 2 uses a fluoroplastic tube bundle heat exchanger. A diameter of a fluoroplastic tube is 3-5 mm, and a vertical height of the heat exchange device 2 in the chimney is 1.5-3 m. Discharge temperature of heated purified high-humidity flue gas is 80-100° C., and temperature of to-be-processed flue gas is 100-150° C.

An adsorption catalysis module layer 6 is detachable, and one of activated carbon, Fe-loaded activated carbon, Co—Mn loaded activated carbon, and the like is filled inside the adsorption catalysis module layer 6, and a grain diameter of an adsorbent is 0.2-1 cm. An absorption tower 8 is provided with one to three adsorption catalysis module layers 6, and a thickness of each module layer is 20-40 cm. An adsorbent in the adsorption catalysis module layer 6 does not need to be replaced and only needs to be deashed regularly.

Two layers are disposed inside a spray layer 10. A demisting layer uses double layers for demisting: a baffle plate demister and a large-particle activated carbon layer, ozone inlet pipes are disposed on the baffle plate demister and below the large-particle activated carbon layer to further strengthen removal of remaining pollutants.

The adsorption liquid reagent may include the following by weight percentage: oxidizing agent 0.1%-1%, alkali 1%-5%, and water as balance. The oxidizing agent may be any one or a combination of $NaClO_2$ and $H_2O_2$; the alkali may be one of sodium alkali and calcium alkali; and a pH value of the circulating adsorption liquid may be 5-11.

A basic principle of the present invention may be as follows: Temperature of dedusted complex flue gas having undergone heat discharge may be reduced; on one hand, high-temperature decomposition of $O_3$ may be reduced and use efficiency of $O_3$ may be increased; and on the other hand, a high-temperature loss of the adsorbent may be reduced. Flue gas enters an adsorption catalysis oxidation tower after being mixed with $O_3$, and under an action of adsorption and catalysis of an adsorbent, oxidizability of $O_3$ may be fully activated; $O_3$ oxidizes insoluble NO into $NO_2$ in the flue gas, oxidizes a part of VOCs into $CO_2$ and $H_2O$, oxidizes a part of VOCs into a small molecule organic matter that may be easily removed, and oxidizes Hg and other heavy metals into ion forms that are easily absorbed and removed. In addition, some fluorides, chlorides, and heavy metals, and the like are adsorbed and removed. $O_3$ may oxidize and decompose pollutants adsorbed on a surface of the adsorbent, so that the adsorbent may be continually regenerated, and therefore the adsorbent in the system does not need to change replaced for regeneration. Waste gas treated through adsorption catalysis oxidation processing enters the enhanced absorption unit. $NO_2$, $SO_2$, heavy metal ions, VOCs, fluoride, and chloride in the waste gas are in full contact with absorption liquid in the efficient absorption tower, and are removed through adsorption, dissolution, neutralization, oxidation, complexation, and other process. Flue gas enters the demisting layer subsequently; most water mist may be removed by using the baffle plate demister, an ozone inlet pipe and a large-particle activated carbon layer are disposed above the baffle plate demister; a part of $O_3$ may be added to further remove remaining VOCs and other pollutants, and dehydration may be further performed. Subsequently, purified flue gas may be introduced into the chimney through the draught fan, and performs heat exchange with the built-in efficient heat exchange device in the chimney. The purified flue gas may be heated to remove white smoke and implement deep purification and standard discharge of complex waste gas.

Using incineration flue gas generated by a small waste incineration plant as an example, when the waste gas purification system provided in the present invention may be used to perform treatment on the flue gas, an air volume may be 5000 m$^3$/h; temperature of dedusted flue gas may be 160° C.; and a concentration of a main ingredient $SO_2$ of the waste gas may be 600 mg/m$^3$; an average concentration of $NO_x$ may be 350 mg/m$^3$; a concentration of total volatile organic compounds (TVOCs) may be 150 mg/m$^3$; a concentration of heavy metal Hg may be 0.5 mg/m$^3$; a concentration of fluoride may be 15 mg/m$^3$; and a concentration of chloride may be 73 mg/m$^3$. Pollutant purification effects are shown in the Table.

TABLE 1

Process conditions and pollutant purification effects

| Sequence number | Process conditions | Purification effects |
|---|---|---|
| 1 | (1) A diameter of a fluoroplastic pipe of a built-in efficient heat exchange device is 3 mm, and a vertical height of the fluoroplastic pipe in a chimney is 1.5 m. (2) Three adsorption catalysis module layers are disposed and internally filled with activated carbon with a grain diameter of 0.2 cm, and a thickness of each module layer is 20 cm. (3) An adsorption liquid reagent may include (by weight percentage) $NaClO_2$ 0.1%, sodium alkali 1%, and water as balance; and a pH value of circulating adsorption liquid is 11. | Discharge temperature of heated purified high-humidity flue gas is 80° C., and temperature of to-be-processed flue gas is 120° C. In the purified flue gas, a concentration of $SO_2$ is 3 mg/m$^3$ and an average removal rate is 99.5%; an average concentration of $NO_x$ is 24 mg/m$^3$ and an average removal rate is 93.1%; a concentration of TVOCs is 10 mg/m$^3$ and an average removal rate is 93.3%; a concentration of heavy metal Hg is 0 mg/m$^3$ and an average removal rate is 100%; a concentration of fluoride is 0.3 mg/m$^3$ and an average removal rate is 98%; and a concentration of chloride is 2.3 mg/m$^3$ and an average removal rate is 96.8%. |
| 2 | (1) A diameter of a fluoroplastic pipe of the built-in efficient heat exchange device is 5 mm, and a vertical height of the fluoroplastic pipe in the chimney is 3.0 m. (2) One adsorption catalysis module layer is disposed and internally filled with Fe-loaded activated carbon with a grain diameter of 0.5 cm, and a thickness of each module layer is 40 cm. (3) An adsorption liquid reagent may include (by weight percentage) $H_2O_2$ 1%, calcium alkali 5%, and water as balance; and a pH value of circulating adsorption liquid is 5. | Discharge temperature of heated purified high-humidity flue gas is 90° C., and temperature of the to-be-processed flue gas is 110° C. In the purified flue gas, a concentration of $SO_2$ is 0 mg/m$^3$ and an average removal rate is 100%; an average concentration of $NO_x$ is 30 mg/m$^3$ and an average removal rate is 91.4%; a concentration of TVOCs is 13 mg/m$^3$ and an average removal rate is 91.3%; a concentration of heavy metal Hg is 0 mg/m$^3$ and an average removal rate is 100%; a concentration of fluoride is 0.7 mg/m$^3$ and an average removal rate is 95.3%; and a concentration of chloride is 4.8 mg/m$^3$ and an average removal rate is 93.4%. |
| 3 | (1) A diameter of a fluoroplastic pipe of the built-in efficient heat exchange device is 3 mm, and a vertical height of the fluoroplastic pipe in the chimney is 3 m. (2) Two adsorption catalysis module layers are disposed and internally filled with Co—Mn-loaded activated carbon with a grain diameter of 1 cm, and a thickness of each module layer is 30 cm. (3) An adsorption liquid reagent may include (by weight percentage) $NaClO_2$ 1% + $H_2O_2$ 1%, sodium alkali 2%, and water as balance; and a pH value of circulating adsorption liquid is 7. | Discharge temperature of heated purified high-humidity flue gas is 95° C., and temperature of to-be-processed flue gas is 100° C. In the purified flue gas, a concentration of $SO_2$ is 0 mg/m$^3$ and an average removal rate is 100%; an average concentration of $NO_x$ is 13 mg/m$^3$ and an average removal rate is 96.3%; a concentration of TVOCs is 8 mg/m$^3$ and an average removal rate is 94.6%; a concentration of heavy metal Hg is 0 mg/m$^3$ and an average removal rate is 100%; a concentration of fluoride is 0.4 mg/m$^3$ and an average removal rate is 97.3%; and a concentration of chloride is 2.8 mg/m$^3$ and an average removal rate is 96.2%. |

Table 1 shows that some embodiments of the present invention may have a good removal effect on waste gas containing complex organic and inorganic components.

In addition, some embodiments of the present invention may have one or more of the following effects:

(1) Pollutant removal efficiency may be high: the average removal efficiencies of $SO_2$, $NO_x$, VOCs, heavy metal Hg, fluoride, and chloride are greater than or equal to 99%, 90%, 90%, 99%, 90%, and 90%, respectively. In addition, some other embodiments of the present invention may further remove white smoke, and implement deep purification and high standard discharge of complex waste gas.

(2) A combined process of adsorption catalysis oxidation and enhanced absorption may be used. A part of pollutants may be removed and absorption performance of the pollutants may be improved through a front-stage process. A combination of ozone and activated carbon may be used in a front stage to remove a part of pollutants; production load of a subsequent process may be reduced, efficient removal of various pollutants may be implemented through a subsequent enhanced absorption process; a subsequent enhanced absorption process may be used to implement efficient removal of various pollutants, thereby implementing double efficient cooperative control of various pollutants within a method and between methods.

(3) Ozone preparation may be mature and reliable; an ozone use amount may be small; raw materials of an absorbent have a wide source, low price, and simple transportation, storage, and application. A complete set of process apparatus may be compact in design, have small occupation space and low operation costs, and has no secondary pollution.

(4) Process selection may be flexible. Some process operation routes (such as an ozone adding process, an ozone non-adding process, an ozone staged adding process) may be adjusted according to different pollutant types, concentrations, and emission standards. An entire process may be simple, operation may be easy, and pollutant removal efficiency may be high.

(5) The process may be applied to solid waste incineration flue gas treatment, biomass burning flue gas treatment, industrial furnace flue gas treatment, and anther field, in particular, may be more advantageous in an enterprise having built a waste water treatment station, and has wide overall application range and high adaptability.

Embodiments of the present specification may be described in a progressive manner; each embodiment focuses on the difference from other embodiments, and the same and similar parts between the embodiments may refer to each other.

Several examples are used for illustration of the principles and implementation methods of the present invention. The description of the embodiments may be used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The invention claimed is:

1. A waste gas purification system, comprising:
   an adsorption-catalysis-oxidation unit;
   an enhanced absorption unit;
   an air inducing unit; and
   a flue gas discharge and heat exchange unit; the adsorption-catalysis-oxidation unit, the enhanced absorption unit, the air inducing unit, and the flue gas discharge and heat exchange unit being sequentially connected;
   wherein:
   a first waste gas enters a heat exchange device of the flue gas discharge and heat exchange unit through a first waste gas delivery pipeline to perform heat exchange, then is converged with a second waste gas in a second waste gas delivery pipeline, and enters a third waste gas delivery pipeline;
   the converged waste gas in the third waste gas delivery pipeline is purified and converted to a purified flue gas by sequentially passing through the adsorption-catalysis-oxidation unit and the enhanced absorption unit;
   the purified flue gas is introduced into the flue gas discharge and heat exchange unit by the air inducing unit; and
   the purified flue gas is discharged after performing heat exchange with the heat exchange device.

2. The waste gas purification system according to claim 1, wherein:
   the adsorption-catalysis-oxidation unit comprises an ozonator and an adsorption catalysis oxidation tower;
   a gas distribution plate is disposed at a lower part inside the adsorption catalysis oxidation tower;
   a gas outlet of the adsorption catalysis oxidation tower is disposed at an upper part inside the adsorption catalysis oxidation tower;
   gas inlet pipes and adsorption catalysis module layers are disposed between the gas distribution plate and the gas outlet of the adsorption catalysis oxidation tower;
   the gas inlet pipes and the adsorption catalysis module layers are in cross arrangement vertically; and
   the ozonator is connected to a first ozone delivery pipeline, and the first ozone delivery pipeline is connected to the gas inlet pipes after being combined with the third waste gas delivery pipeline.

3. The waste gas purification system according to claim 2, wherein
   the enhanced absorption unit comprises an absorption tower and an absorption liquid preparation unit;
   a liquid outlet, a gas inlet of the absorption tower, a vortex plate, a spray layer, a baffle plate, an ozone inlet pipe, an activated carbon layer, and a gas outlet of the absorption tower are sequentially disposed inside the absorption tower with the liquid outlet being relatively near a bottom of the absorption tower and the gas outlet of the absorption tower being relatively near a top of the absorption tower;
   the ozonator is communicated with the ozone inlet pipe through a second ozone delivery pipe, and the spray layer sprays absorption liquid downwards; and the absorption liquid preparation unit comprises a reagent preparation tank preparing a reagent and an absorption liquid circulating water tank communicated with both the liquid outlet of the absorption tower and a reagent delivery pipe; and wherein flue gas passing through the adsorption-catalysis-oxidation unit enters the absorption tower through the gas inlet of the absorption tower.

4. The waste gas purification system according to claim 3, wherein the enhanced absorption unit further comprises a circulating water pump delivering absorption liquid in the absorption liquid circulating water tank to the spray layer.

5. The waste gas purification system according to claim 3, wherein the absorption liquid preparation unit further comprises:
- a reagent storage tank storing the reagent prepared by the reagent preparation tank;
- a first absorption liquid delivery pipeline disposed between the reagent preparation tank and the reagent storage tank; and
- a first reagent pump and a first flowmeter disposed on the first absorption liquid delivery pipeline.

6. The waste gas purification system according to claim 5, wherein:
- a pH meter is disposed in the absorption liquid circulating water tank;
- a second absorption liquid delivery pipeline is disposed between the reagent storage tank and the absorption liquid circulating water tank;
- a second reagent pump and a second flowmeter are disposed on the second absorption liquid delivery pipeline; and
- a flow rate of a reagent input to the absorption liquid circulating water tank is adjusted according to a pH value of the pH meter.

7. The waste gas purification system according to claim 6, wherein:
- the air inducing unit comprises a draught fan;
- the gas outlet of the absorption tower is communicated with a gas inlet of the draught fan, and
- a gas outlet of the draught fan is communicated with a gas inlet at the bottom of the flue gas discharge and heat exchange unit.

8. The waste gas purification system according to claim 7, wherein:
- the flue gas discharge and heat exchange unit comprises a chimney, a first waste gas delivery pipeline, a second waste gas delivery pipeline, and a temperature measurement probe;
- a gas inlet, a heat exchange device, a flue gas monitoring device, and a flue gas discharge port are sequentially disposed inside the chimney from bottom to top;
- a first electric valve is disposed on the first waste gas delivery pipeline;
- a second electric valve is disposed on the second waste gas delivery pipeline;
- the first waste gas delivery pipeline is combined with the second waste gas delivery pipeline after passing through the heat exchange device in the chimney;
- the temperature measurement probe is arranged on a pipeline that is located after the first waste gas delivery pipeline and the second waste gas delivery pipeline are combined; and
- flue gas introduced by the draught fan enters the chimney through the gas inlet, and is discharged through the flue gas discharge port after having undergone heat exchange in the heat exchange device.

9. The waste gas purification system according to claim 8, further comprising a control unit configured to adjust the flow rate of the reagent entering the absorption liquid circulating water tank according to monitoring data of the pH meter.

10. The waste gas purification system according to claim 8, further comprising a control unit configured to adjust opening degrees of the first electric valve and the second electric valve according to data collected by the temperature measurement probe and the flue gas monitoring device.

11. A waste gas purification method implemented with the waste gas purification system according to claim 10, comprising the steps of:
- introducing the first waste gas into the flue gas discharge and heat exchange unit;
- collecting monitoring data of the temperature measurement probe and the flue gas monitoring device;
- adjusting opening degrees of the first electric valve and the second electric valve according to the monitoring data of the temperature measurement probe and the flue gas monitoring device;
- mixing the flue gas passing through the flue gas discharge and heat exchange unit with ozone generated by the ozonator;
- introducing the mixed flue gas into the adsorption-catalysis-oxidation unit for treatment;
- introducing, into the enhanced absorption unit, the flue gas treated by the adsorption-catalysis-oxidation unit;
- adding the reagent to an absorption liquid circulating water tank according to the pH value in the absorption liquid circulating water tank collected by the pH meter;
- introducing the absorption liquid into a spray layer in the enhanced absorption unit;
- introducing, through the draught fan, flue gas passing through the enhanced absorption unit into the flue gas discharge and heat exchange unit for heat exchange; and
- discharging, through the flue gas discharge port of the flue gas discharge and heat exchange unit, the flue gas having undergone heat exchange.

* * * * *